United States Patent
Saxena et al.

(10) Patent No.: US 8,448,186 B2
(45) Date of Patent: May 21, 2013

(54) PARALLEL EVENT PROCESSING IN A DATABASE SYSTEM

(75) Inventors: Abhishek Saxena, Belmont, CA (US); Neerja Bhatt, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1164 days.

(21) Appl. No.: 11/777,783

(22) Filed: Jul. 13, 2007

(65) Prior Publication Data

US 2009/0019456 A1    Jan. 15, 2009

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................... 719/318; 719/314

(58) Field of Classification Search ................. 707/628, 707/631, 632; 719/314, 318
See application file for complete search history.

(56) References Cited

U.S. PATENT DOCUMENTS

| | | | |
|---|---|---|---|
| 5,717,745 A * | 2/1998 | Vijay et al. ............... | 379/112.05 |
| 5,721,825 A | 2/1998 | Lawson et al. | |
| 5,999,978 A | 12/1999 | Angal et al. | |
| 6,185,613 B1 | 2/2001 | Lawson et al. | |
| 6,336,139 B1 | 1/2002 | Feridun et al. | |
| 6,367,034 B1 | 4/2002 | Novik et al. | |
| 6,470,223 B1 | 10/2002 | Naganuma | |
| 6,477,558 B1 | 11/2002 | Irving et al. | |
| 6,477,585 B1 | 11/2002 | Cohen et al. | |
| 6,697,810 B2 | 2/2004 | Kumar et al. | |
| 6,829,639 B1 | 12/2004 | Lawson et al. | |
| 6,857,017 B1 | 2/2005 | Faour et al. | |
| 6,901,447 B2 * | 5/2005 | Koo et al. ..................... | 709/227 |
| 6,963,882 B1 | 11/2005 | Eiko et al. | |
| 7,107,328 B1 | 9/2006 | Muthiyan et al. | |
| 7,133,903 B2 | 11/2006 | Yoshii et al. | |

(Continued)

FOREIGN PATENT DOCUMENTS

EP        1351446        10/2003

OTHER PUBLICATIONS

"Event Manager for Oracle" downloaded Jul. 16, 2007 from Internet <http://www.sqlsentry.net/event-manager/enterprise-oracle.asp?ad=IB-Managev3>, 2 pages.

(Continued)

*Primary Examiner* — Emerson Puente
*Assistant Examiner* — Kimbleann Verdi
(74) *Attorney, Agent, or Firm* — Hickman Palermo Truong Becker Bingham Wong LLP; Daniel D. Ledesma

(57) ABSTRACT

Techniques for processing events in parallel are provided. Multiple publishers publish events in parallel to a plurality of channels. Each channel is a queue that maintains a list of events that are awaiting to be processed by one or more slave processes. In one approach, all events that need to be persistent are published to a persistent channel, whereas all events that do not need to be persistent are published to one or more in-memory channels. In another approach, for each event, a publisher determines which channel of the plurality of channels to publish the event. The determination is based, at least in part, on the number of events in each channel and, optionally, the type of each event in each channel. In either approach, each event from a single publisher is published to the same channel.

32 Claims, 3 Drawing Sheets

U.S. PATENT DOCUMENTS

| | | |
|---|---|---|
| 7,146,416 B1 | 12/2006 | Yoo et al. |
| 7,213,068 B1 | 5/2007 | Kohli et al. |
| 7,290,077 B2 * | 10/2007 | Gregg et al. ............ 710/263 |
| 7,392,306 B1 | 6/2008 | Donner et al. |
| 7,403,901 B1 | 7/2008 | Carley et al. |
| 7,441,429 B1 | 10/2008 | Nucci et al. |
| 7,451,162 B2 | 11/2008 | Hess |
| 7,461,043 B2 | 12/2008 | Hess |
| 7,502,972 B1 | 3/2009 | Chilukuri et al. |
| 7,516,208 B1 | 4/2009 | Kerrison et al. |
| 7,526,322 B2 | 4/2009 | Whistler |
| 7,568,232 B2 | 7/2009 | Mitomo et al. |
| 7,721,297 B2 | 5/2010 | Ward |
| 2003/0018530 A1 | 1/2003 | Walker et al. |
| 2003/0172060 A1 | 9/2003 | Uchikado |
| 2003/0182464 A1 * | 9/2003 | Hamilton et al. ............ 709/314 |
| 2003/0212518 A1 | 11/2003 | D'Alessandro et al. |
| 2004/0034640 A1 * | 2/2004 | Jain et al. ............ 707/10 |
| 2005/0021740 A1 | 1/2005 | Bar et al. |
| 2005/0108718 A1 * | 5/2005 | Kumar et al. ............ 718/102 |
| 2005/0122909 A1 * | 6/2005 | Parupudi et al. ............ 370/241 |
| 2006/0004597 A1 | 1/2006 | Charters et al. |
| 2006/0149787 A1 * | 7/2006 | Surlaker et al. ............ 707/200 |
| 2007/0011207 A1 | 1/2007 | Vishnubhotla |
| 2007/0136245 A1 | 6/2007 | Hess et al. |
| 2007/0220215 A1 | 9/2007 | Mizutani et al. |
| 2007/0294352 A1 | 12/2007 | Shraim et al. |
| 2007/0299701 A1 | 12/2007 | Boyer et al. |
| 2008/0184267 A1 | 7/2008 | Hochmuth |
| 2008/0209280 A1 | 8/2008 | Dillo et al. |
| 2008/0275956 A1 | 11/2008 | Saxena et al. |
| 2011/0167433 A1 * | 7/2011 | Appelbaum et al. ......... 719/318 |

OTHER PUBLICATIONS

"Event Manager for Oracle Applications" downloaded Jul. 16, 2007 from Internet <http://www.stanford.edu/dept/itss/docs/oracle/10g/workflow.101/b10284/fwkevts.htm >, 2 pages.

"Events" downloaded Jul. 16, 2007 from Internet <http://www.stanford.edu/dept/itss/docs/oracle/10g/workflow.101/b10284/fwkevt01.htm >, 3 pages.

U.S. Appl. No. 11/743,276, filed May 2, 2007, Final Office Action, Jun. 15, 2011.

U.S. Appl. No. 11/743,276, filed May 2, 2007, Notice of Allowance, Jul. 6, 2011.

* cited by examiner

PARALLEL EVENT PROCESSING IN A DATABASE SYSTEM

RELATED APPLICATION

This application is related to U.S. patent application Ser. No. 11/743,276 entitled GROUPING EVENT NOTIFICATIONS IN A DATABASE SYSTEM, filed on May 2, 2007, the contents of which are herein incorporated by this reference for all purposes as if fully disclosed herein.

FIELD OF THE INVENTION

The present invention relates to processing events that occur in a database system.

BACKGROUND

Many types (i.e., classes) of events occur in a database system. Examples of different classes of events that occur include modifications to a database object (such as a table), a database instance crash, and changes to the state of a message queue. Users, such as administrators, may register to be notified of certain events. Reporting events to such registrants is increasingly becoming a common activity in database systems. It would be desirable to provide an efficient mechanism to process such database events.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
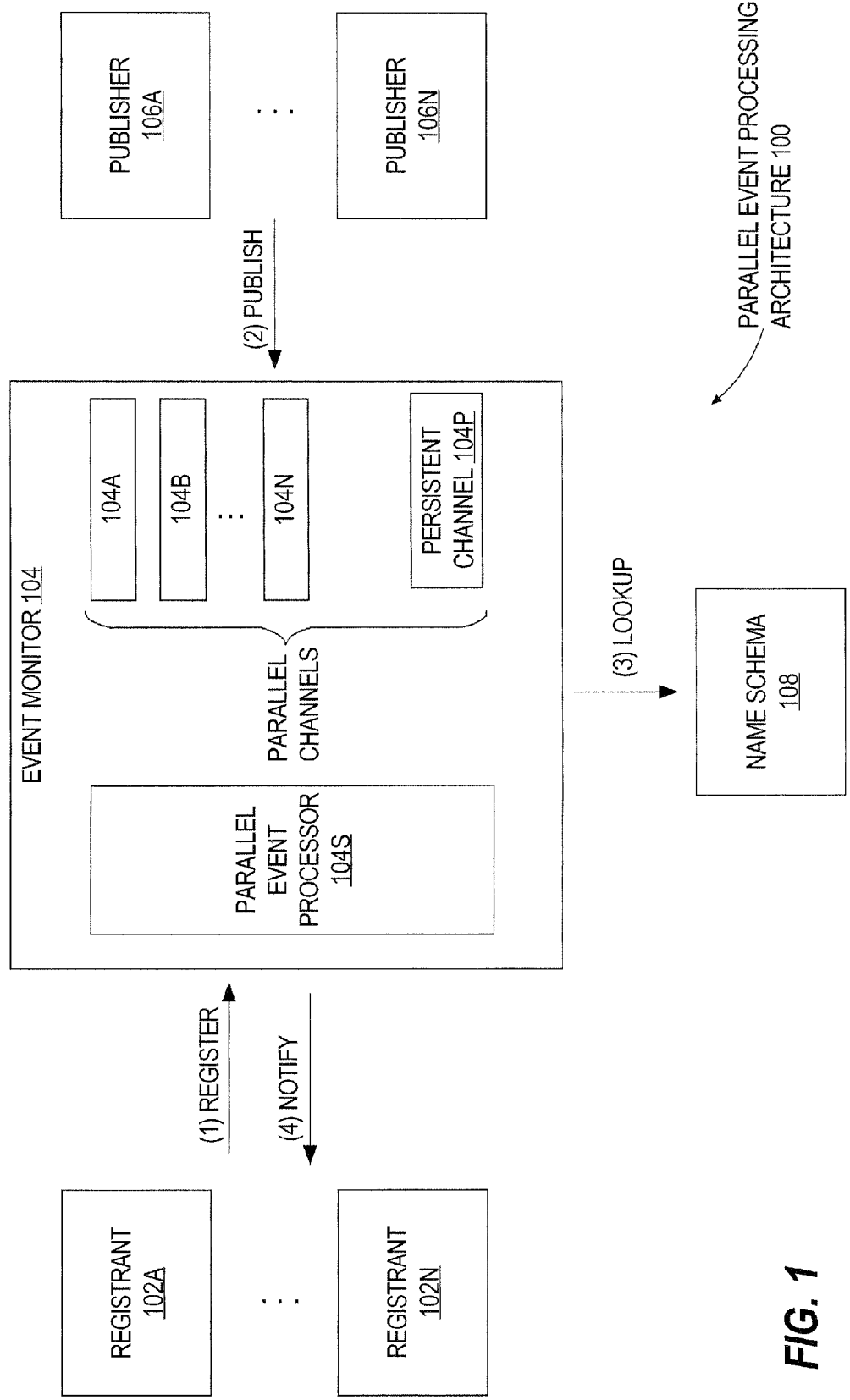
FIG. 1 is a block diagram that illustrates an example parallel event processing architecture, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple approaches are described for processing, in parallel, events that occur in a database system. In one approach, publishers of events publish events to at least two different queues, each of which is accessed by different slave processes. One type of event is an in-memory event and the other type of event is a persistent event. An in-memory event is enqueued to an in-memory queue to await processing by one slave process while a persistent event is enqueued to a persistent queue to await processing by another slave process. In this way, the processing of persistent events will not (at least significantly) affect the processing of in-memory events.

In another approach, multiple queues (hereinafter referred to as "channels") are created and maintained. An event publisher determines to which channel of the multiple channels to publish an event. The determination is made based, at least in part, on the length of each queue and, optionally, the class of each event that is enqueued to each queue. The publisher then enqueues the event to the determined queue. Thereafter, all subsequent events originating from the same database session are enqueued to the determined queue without the publisher having to perform the same determination for each subsequent event that the publisher publishes.

As used hereinafter, an "event" is any occurrence of interest in a database system, whether that occurrence is a change to a file or object or a change to the amount of consumed shared memory in the database system at a particular point in time. Additionally, an event may be the lack of activity. For example, an administrator may register to be notified if a table is not accessed within a certain specified period of time.

General Guidelines for a Parallel Event Processing Architecture

There are at least three general guidelines (i.e., not necessarily requirements) for a parallel event processing architecture. One general guideline is that notifications for events should be provided to entities who registered to be notified about the occurrences of those events in the same order in which those events occurred. Such ordering is important, for example, in order to accurately determine a cause of a problem.

Another general guideline is based on quality of service of event notifications. In-memory event notifications are more commonly used in the majority of event notification applications that run on top of a database management system (DBMS) because in-memory events may be delivered faster. On the other hand, some applications warrant reliable event notifications that persist across database instance crashes. A parallel event processing server should be able to serve both kinds of notifications reasonably well.

Another general guideline involves acceptable CPU and memory consumption of the parallel event processing server. A DBMS handles a wide variety of tasks and uses shared memory for numerous foreground and background activities. It is therefore often important to minimally and optimally use such resources for parallel event processing.

Example Parallel Event Processing Architecture

FIG. 1 is a block diagram that illustrates an example parallel event processing architecture 100, according to an embodiment of the invention. Architecture 100 includes registrants 102A-N (referred to collectively as "registrants 102"), an event monitor 104, publishers 106A-N (referred to collectively as "publishers 106"), and a name schema 108. Event monitor 104 comprises parallel channels 104A-N and 104P, and parallel event processor 104S.

Name schema 108 maintains data about each event registration received from a registrant. Name schema 108 is used by event monitor 104 to (1) maintain statistics about events, (2) determine which event registrations are affected by an event, (3) determine which event registrations are expired, and (4) determine which registrants should receive an event notification. Name schema 108 may include a data dictionary table, grouping data, completion list, and registration statistics, each of which is described in U.S. patent application Ser. No. 11/743,276 entitled GROUPING EVENT NOTIFICA- TIONS IN A DATABASE SYSTEM, filed on May 2, 2007, which is incorporated by reference.

Communications links between registrants 102 and event monitor 104 may be implemented by any medium or mechanism that provides for the exchange of data. Examples of communications links include, without limitation, a network such as a Local Area Network (LAN), Wide Area Network (WAN), Ethernet or the Internet, or one or more terrestrial, satellite, or wireless links.

Registrants

As FIG. 1 illustrates, there may be multiple registrants 102. As used hereinafter, a "registrant" refers to a client that sends a request to register to be notified about an occurrence of an event (referred to as an "event registration request"). A client may be any type of client, such as an Oracle Call Interface (OCI) client or a Java Database Connectivity (JDBC) client.

Registrants 102A to 102N may use any mechanism for issuing an event registration request. The actual hardware and/or software components that communicate an event registration request to event monitor 104 may include, without limitation, an application or an application server. A registrant may issue an event registration request from any computing device, such as a mobile phone, PDA, laptop computer, or a desktop computer. Additionally or alternatively, a registrant may register for event monitor 104 to initiate a server-side function or a callback procedure (such as a PL/SQL procedure) when a certain event occurs.

Channels

For event monitor 104 to scale well, event monitor 104 should not only process events in parallel but also receive events in parallel. Therefore, according to an embodiment of the invention, multiple channels (e.g., channels 104A-N in FIG. 1) are created and maintained. A channel is a queue (or data structure) that maintains a set of events that are waiting to be processed by a parallel event processor. Because there are multiple channels to which events may be posted, publishers 106 may publish events in parallel.

A channel may be implemented in numerous ways. Embodiments of the invention are not limited to any particular way. For example, a channel may be implemented as a linked list, an array, a table, or a vector.

Events may be processed from a channel according to first-in-first-out (FIFO) or other technique for selecting events to process that ensures publisher-level ordering (i.e., events from the same publisher are processed in the same order in which the publisher published the events), which is described in more detail below. An example of another technique is removing all events of one class from a channel before removing any events of another class from the channel.

In one embodiment, at least two different types of channels are created and maintained—an in-memory channel and a persistent channel (e.g., persistent channel 104P in FIG. 1) that resides on disk. Two different types of channels are created because there are two different types of events—in-memory events and persistent events—regardless of whether the event is a Streams event, a Continuous Query (CQ) event, or a Fast Application Notification (FAN) event. Some registrants may require that certain events "survive" database server crashes. Maintaining persistent events, i.e., events that are stored on disk, ensures that such events are not lost during a crash.

By dividing channels in this manner, a process (whether a publisher or an event processor) that processes in-memory events should be fast and not adversely impacted by persistent event work. In contrast, if an event processor had to process events from a channel that contained both in-memory events and persistent events, then the in-memory events in the channel would have to wait for a significant amount of time while the event processor processed a persistent event in the channel. Processing persistent events takes a relatively significant amount of time because disk access is much slower than shared memory access.

Publishers

Each publisher 106 is a server process that services requests from applications, such as a database application executing on a client machine. As an application initiates one or more changes to the database system, a publisher generates one or more events that will be processed by event monitor 104.

Because there are multiple classes of events that occur in a database system, a publisher may be classified based on the class of event that the publisher publishes. Non-limiting examples of three classes of events described previously include stream events (such as a message enqueue or dequeue), CQ events (such as a row insert, delete, or update), and FAN events (such as a database crash, shutdown, or startup). Thus, publisher 106A may be a stream event publisher, a CQ publisher, or a FAN event publisher. There may also be explicitly posting publishers. Explicitly posting publishers are users, applications, and/or application servers that generate events and post them directly to Event Monitor 104. Such posting enables the notification of events that occur "outside" the database system. Such posting also enables event-based communication of users and applications.

For greater scalability, publishers should publish in parallel. In-memory event publishers publish to one or more in-memory channels. Persistent event publishers publish to a persistent queue.

Once a publisher selects a channel to which to publish an event, the publisher publishes events to that same channel for the "lifetime" of the publisher. The lifetime of a publisher is typically the period of time that the associated client application has an established connection with the database system, which period of time is referred to as a database session. Thus, a publisher publishes to the same channel for the duration of a database session associated with the publisher. However, the lifetime of a publisher might be based on a different period of time, such as the duration of a database transaction. Whichever lifetime is used for a publisher, such publishing to the same channel ensures publisher-level ordering of events. The proper order of events may be useful for various reasons. For example, a correct order of events is almost essential for an administrator to determine the cause of a system crash.

One way to ensure that a publisher publishes to the same channel is for the publisher, after selecting a channel, to maintain an identifier for the channel (e.g., a channel number) in an area of memory accessible to the publisher. A publisher uses the identifier for the publisher's lifetime to ensure that the publisher publishes any subsequent events to the same channel.

Determining to which Channel to Publish an Event

A publisher that is determining to which channel to publish an event is referred to hereinafter as the "new publisher." In one embodiment, when a new publisher is to publish a registered event for the first time, the new publisher performs a check of an in-memory cached representation of a data dictionary table to determine whether there is a registrant for the event. If so, then the new publisher selects, as the channel to which the new publisher will publish events, any currently unused channel (i.e., any channel in which no events are currently waiting to be processed). When there are no currently unused (empty) channels, then a new publisher may take many factors into account in order to determine which channel to select. One such factor may be the current load of each channel and the class of each event in each channel. If all channels are equally loaded (e.g., have the same number of events), then channels may be selected randomly.

Channel load may be maintained as part of notification statistics. The load of a channel may simply be the number of events currently in the channel. Alternatively, channel load may be a function of multiple variables, such as the number of notifications processed from this channel, total channel latency, total event processing time, total notification callback execution time, and other useful parameters of the channel.

Another factor that may be used to select a channel is the class of the events that the new publisher is to publish. The class of a publisher is based on the first event that the publisher publishes. Generally, a publisher only publishes one class of events; however, a publisher may publish multiple classes of events.

Some classes of events, such as FAN events, occur relatively infrequently. The load on a channel that may receive such an event is expected to be low. Thus, even though a particular channel may be the most loaded channel relative to other channels, a new publisher may select the particular channel as the channel to which to publish a FAN event.

However, other classes of events occur relatively frequently per session, such as continuous query (CQ) events. The load on a channel that may receive such an event is expected to be high because one CQ event is typically followed by more CQ events from the same publisher. Thus, in one embodiment of the invention, a new publisher of a CQ event is more likely to select a more lightly loaded channel relative to other channels.

Another factor that may be used to select a channel is whether a channel is "active." In one embodiment, a new publisher marks a selected channel as "active." The active/non-active status of a channel is one indicator of whether the channel is likely to immediately receive additional events. For example, a new publisher may select an inactive channel over an active channel even if the inactive channel is more heavily loaded relative to the active channel.

Another factor that may be used to select a channel is how many active publishers have published to the channel. This number indicates how active a channel is relative to other channels. To track the number of active publishers to a channel, a counter is associated with that channel. Upon selecting a particular channel, a publisher increments the particular channel's counter. When a publisher "dies" (e.g., the database session associated with the publisher ends), the counter is decremented. Therefore, a new publisher may determine which channel to select based, at least in part, on the counter associated with each channel.

Because some channels may be maintained in volatile memory, there should be a limit on the number of events that are published to the multiple channels and that are waiting to be processed. In an embodiment, an upper limit of X % of volatile memory is granted to channels (which limit may be configurable by a user). Upon the occurrence of each event, the sum of memory consumed by all the channels is calculated to determine whether or not to allow the event to be published to the channel. If the X % limit is reached, then any in-memory publishers block. However, in one embodiment of the invention, persistent publishers have no such limit and thus do not block.

Figure 3:
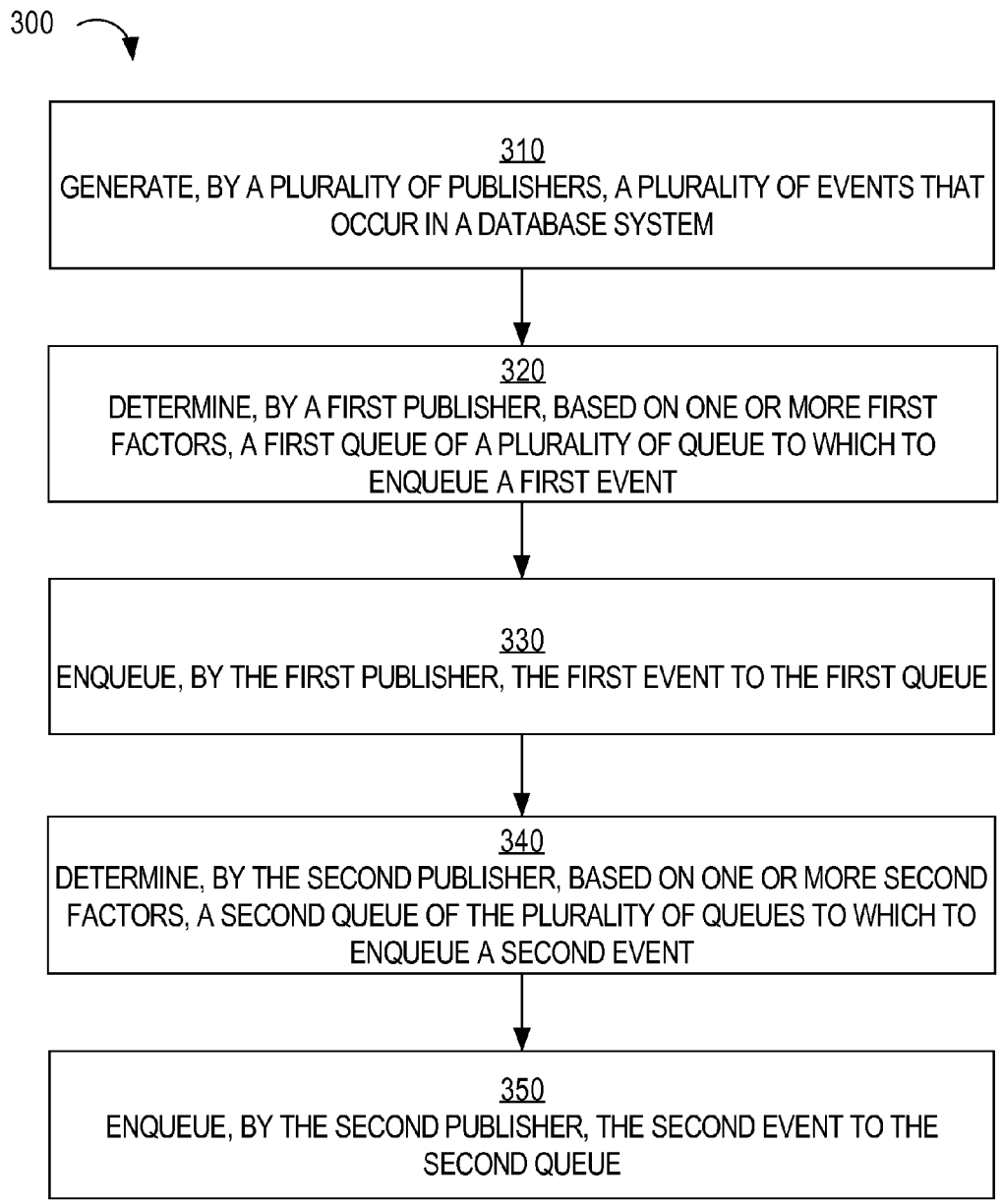
FIG. 3 is a flow diagram that depicts a process for enqueuing events, in an embodiment.

FIG. 3 is a flow diagram that depicts a process 300, according to an embodiment of the invention. At block 310, a plurality of publishers generate a plurality of events in a database system. At block 320, a first publisher determines, based on one or more first factors, a first queue of a plurality of queues to which to enqueue a first event. At block 330, the first publisher enqueues the first event to the first queue. At block 340, a second publisher determines, based on one or more second factors, a second queue of a plurality of queues to which to enqueue a second event. At block 350, the second publisher enqueues the second event to the second queue.

Example Algorithm for Selecting a Channel

According to an embodiment of the invention, new publishers use at least two factors for selecting a channel from a plurality of channels. One factor (referred to hereinafter as "$T\_pro$") is the expected notification time of a new event, i.e., the "expected" period of time between when a publisher publishes an event to a channel and when that event is fully processed (e.g., causing a notification to be sent to a registrant). The calculation of $T\_pro$ takes into account multiple variables that are associated with each channel. Such variables may include the following:

n: number of outstanding events in a channel cl: average channel latency (average time between an event being published to this channel and the event being "picked up" by a slave process that is assigned to this channel for processing)

pt: average processing time (average time a slave process requires to process an event from this channel)

Thus, $T\_pro$ (i.e., the expected notification time of a new event) of a particular channel $= n*(cl+pt)$. Factor $T\_pro$ affects notification latency of a current event in a particular channel.

Another factor (referred to hereinafter as "N") is the expected number of new outstanding events in a particular channel during the expected publish time of the new publisher. The calculation of N also takes into account multiple variables that are associated with each channel. Such variables may include the following:

$f\_pub(i)$: frequency of class 'i' events published to this channel $n\_pub(i)$: number of events of class 'i' published to this channel $n\_pub(sum)$: number of all events published to this channel $w\_pub(i)$: weight of class 'i' for this channel $= n\_pub(i)/n\_pub(sum)$ where 'i' belongs to the set of classes of current publishers (e.g., Streams publishers, CQ publishers, and FAN publishers) and the new publisher. Thus, the weighted average of frequency of events that are published to this channel is given by:

$f\_pub(\text{weighted average}) = \Sigma(\text{for all 'i'})(f\_pub(i)*w\_pub(i))/\Sigma(\text{for all 'i'})(w\_pub(i))$ In one embodiment, the frequency and weight of the new publisher is also included in the above calculation. Because there is no history of a new publisher, the frequency and weight of publishers (of that class of events) that publish to the channel may be used to determine $f\_pub(i)$ and $w\_pub(i)$. If there is no history of such publishers, then the average frequency and average weight of publishers (of that class of events) that publish to all other channels may be used to determine $f\_pub(i)$ and $w\_pub(i)$. If there is no history of such publishers, then the value 0 may be used.

Similarly, f_pro(i): frequency of events of class 'i' processed from this channel n_pro(i): number of events of class 'i' processed from this channel n_pro(sum): number of all events processed from this channel w_pro(i): weight of class 'i' events processed from this channel=n_pro(i)/n_pro(sum)

where 'i' belongs to the set of classes of events that are processed from this channel. Thus, the weighted average frequency of events processed from this channel is given by:

f_pro(weighted average)=Σ(for all 'i')(f_pro(i)*w_pro(i))/Σ(for all 'i')(w_pro(i))

For f_pro(i) and w_pro(i), the frequency and weight of processing that class of events from that channel is used. If there is no history of such processing, then the average frequency and average weight of processing of that class of events from all other channels may be used to determine f_pro(i) and w_pro(i). If there is no history of such processing, then the value 0 may be used.

The statistics described above (i.e., n, cl, pt, f_pub(i), n_pro(i), n_pro(sum), etc.) may be maintained by event monitor 104 as part of channel statistics.

"T_pub" refers to the expected "lifetime" of a new publisher. Because there is no history of a new publisher, the average lifetime of publishers of that class of events that publish to that channel may be used to determine T_pub. If there is no history of such a lifetime with respect to that channel, then the average lifetime of publishers (of that class of events) that publish to all channels may be used to determine T_pub. If there is no history of such a lifetime, then T_pro may be used for T_pub.

As mentioned above, N is the total number of new outstanding events in a channel at the end of the new publisher's "life." In other words, N is an estimated number of events that will be published to the channel by any publisher(s) during the lifetime of the new publisher minus an estimated number of events that will be processed from the channel during the lifetime of the new publisher. Thus, N=[f_pub(weighted average)−f_pro(weighted average)]*T_pub.

N affects notification throughput and latency of all events, subsequent to the current event, that any publisher(s) will publish to a particular channel, if selected.

One goal in determining which channel to publish an event is to select a channel that provides relatively low notification latency and high throughout for the current event as well as subsequent events. Thus, a new publisher selects a channel that has a minimum weighted average of factors T_pro and N:

$w_T$: weight of T_pro (analogous to weight of notification latency of the current event)

$w_N$: weight of N (analogous to weight of notification throughput and latency of events subsequent to the current event that are published by any publisher(s) to this channel)

A selected channel should have:

MINIMUM [($w_T$*T_pro+$w_N$*N)/($w_T$+$w_N$)]

The weights $w_T$ and $w_N$ depend upon class of events. For CQ events and Streams events, a higher weight should be given to N (which affects notification latency and throughput of a large number of events) than to T_pro (which affects notification latency of the first published event by the new publisher). This is so because CQ events and Streams events are larger in number and more frequent. On the other hand, for other events, such as FAN events, higher weight should be given to T_pro and lower weight to N because such events are fewer in number and less frequent. Also, because "faster" notification delivery is a significant goal for such events (which T_pro affects), the throughput and/or latency of subsequent events (which are affected by N) are less important. For example, for CQ events, $w_T$ and $w_N$ might be 0.1 and 09, respectively; for FAN events, $w_T$ and $w_N$ might be 0.9 and 0.1, respectively; and for Streams events, $w_T$ and $w_N$ might be 0.5 and 0.5, respectively.

In summary, a publisher first selects unused channels and then, once no channel is empty, a publisher may use multiple factors, including the above algorithm, to determine the most usable channel. However, there are a myriad of ways in which a channel may be selected and embodiments of the invention are not limited to any particular way. Whichever method is used, if two or more channels are equally usable, then a publisher may randomly select one of the two channels.

Parallel Event Processor

In an embodiment, parallel event processor 104S comprises a coordinator process (referred to hereinafter simply as "the coordinator") and set of subordinate processes (referred to hereinafter as "slaves").

Each slave process may be associated with a specific channel. For example, one slave might process events from only one channel. In a related example, events in a channel might be processed by only a single slave process (but that slave process might also process events from other channels). An N-to-1 mapping of channel to slave ensures publisher-level ordering, while a 1-to-1 mapping of channel to slave also increases throughput.

When the first registered event occurs in a database system, a publisher publishes the event to a channel and the coordinator is started. The coordinator then starts a slave and associates the slave with the channel. The slave subscribes to the channel for receiving events. The coordinator starts up to N+1 slaves to process published events where N is a positive integer. Of these, N slaves process in-memory events and one slave processes persistent events.

The slaves wait on channels before processing events and issuing notifications to the proper registrants. To conserve resources, slaves may "sleep" (and release CPU resources) when there are no events in their respective channels. Also, slaves may be instantly awakened when events are published to their respective channels.

Channels and slave structures may be kept in shared memory of the database server for inter-process communication. A slave structure contains metadata information about a slave, such as a slave ID, status of slave (e.g., running, exited, errored, done), type of slaves (e.g., whether processing in-memory events or persistent events), information about client connections, and a reference to channel statistics. A slave structure is accessed mostly by its own slave and, at times, by the coordinator for communication with the slave for the slave's management.

Because each channel and slave structure is accessed only by a single slave (at least most of the time), each channel and slave structure may be aligned on a word boundary for fast access without latch contention. Latches are a type of locking mechanism that prevents processes from accessing data that is associated with a latch that is held by another process.

One purpose of the coordinator is to detect such slave failures and restart appropriate slaves. Recovery in event processing may be ensured at many critical points that need to be atomically handled. The coordinator itself may be restarted upon death.

If the coordinator detects a database shutdown event, then the coordinator determines whether a notification of the event needs to be sent. If so, then the coordinator ensures that a slave is alive to process the event and issue the notification. The coordinator then shuts down each slave by modifying metadata for each slave to indicate that the slave needs to shut down. When a slave reads its respective metadata, the slave updates the metadata to indicate that the slave is shut down. The coordinator checks each metadata to determine if each slave performed a self-shutdown. The coordinator also determines whether any slaves died suddenly or errored out. The coordinator ensures that any resources (e.g., channel handle) that such slaves held are properly cleared.

Many benefits may be realized from certain embodiments of the invention. One such benefit is that multiple channels allow publishers to publish with increased parallelism. Another benefit is that multiple slaves allow events from different publishers to be processed in parallel, which improves throughput. For example, an event might be "slow." A slow event might be caused by a slow callback procedure, on a registrant, e.g., due to a slow network connection. A slow event from one channel should not affect the processing of events from other channels. Therefore, registrants for events from the other channels should not wait any longer due to the slow event in one channel.

Another benefit of certain embodiments of the invention is that, because persistent events may be processed separately from in-memory events, the slower persistent event processing does not negatively affect the faster in-memory event processing.

Further, as a result of certain embodiments of the invention, events are processed faster than if only one process processed all events. This decrease in event processing time translates into less memory being required to process the events, which in turn leads to the freeing up of shared memory in a database server for other processes.

The above description applies also to a shared-disk database system with multiple instances, such as the Oracle Real Application Cluster (RAC) where a separate parallel event processor serves each database instance where registered event activity occurs. In a shared-disk database system, publisher-level ordering of events (where a publisher publishes its events to one instance) is also honored.

Hardware Overview

Figure 2:
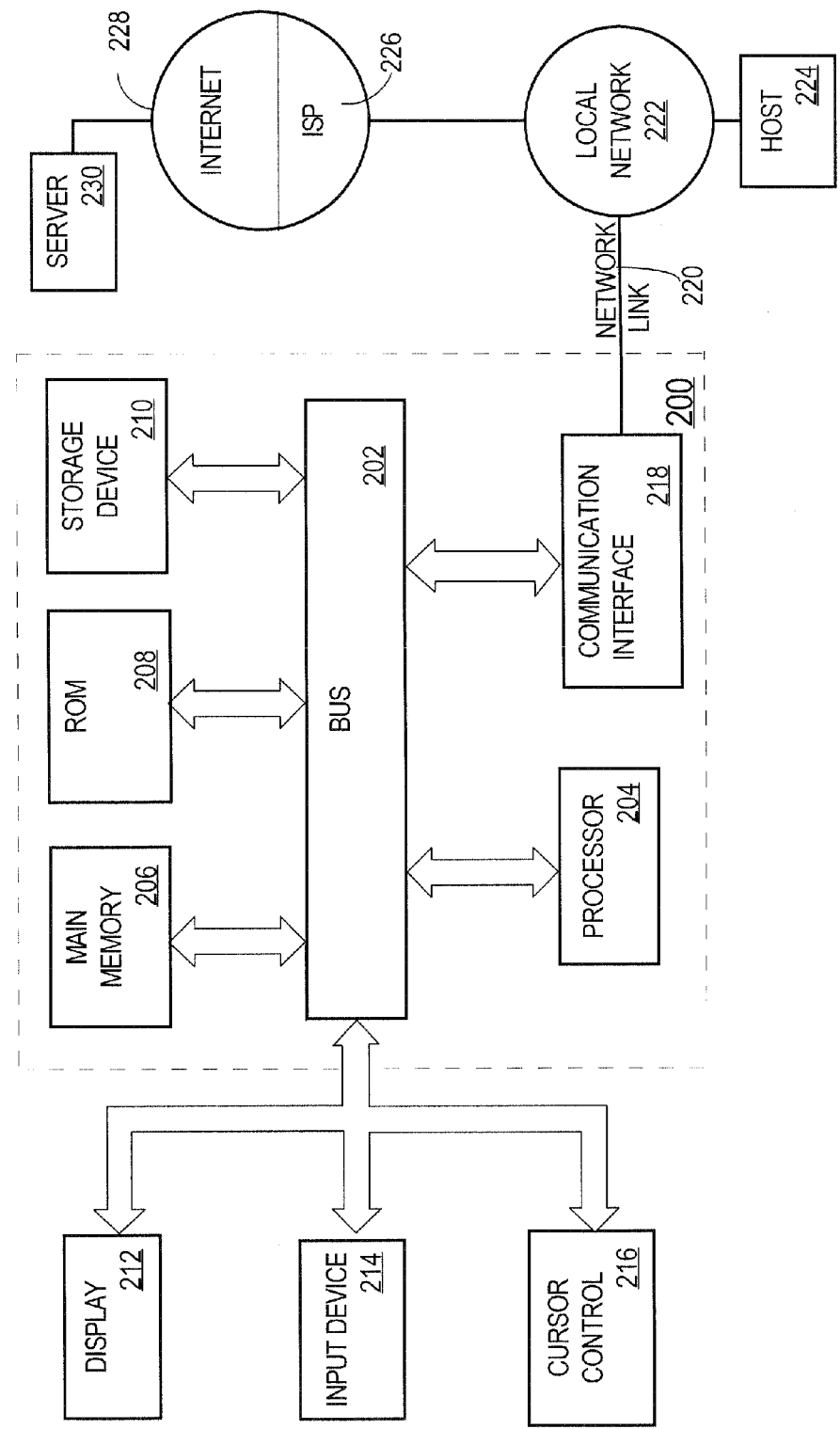
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    generating, by a plurality of publishers, a plurality of events that occur in a database system, wherein the plurality of events includes a first event that is generated by a first publisher and a second event that is generated by a second publisher that is different than the first publisher;
    determining, by the first publisher, based on one or more first factors, a first queue from among a plurality of queues to enqueue the first event, wherein one of the one or more first factors is a number of events that are enqueued in each queue of the plurality of queues;
    enqueuing, by the first publisher, the first event to the first queue of the plurality of queues;
    determining, by the second publisher, based on one or more second factors, a second queue from among a plurality of queues to enqueue the second event, wherein one of the one or more second factors is a number of events that are enqueued in each queue of the plurality of queues; and
    enqueuing, by the second publisher, the second event to the second queue of the plurality of queues;
    wherein the method is performed by one or more computing devices.

2. The method of claim 1, further comprising executing a plurality of slave processes, wherein each queue of the plurality of queues is assigned at most one slave process from the plurality of slave processes.

3. The method of claim 1, further comprising, after enqueing the first event to the first queue and for each event of multiple events generated by the first publisher after the first event:
    enqueuing, by the first publisher, said each event of the multiple events to the first queue without the first publisher determining to which queue of the plurality of queues to enqueue said each event of the multiple events.

4. The method of claim 1, wherein:
    the one or more first factors includes a type of each event in each queue of the plurality of queues.

5. The method of claim 4, wherein:
    the one or more first factors includes a number of events of each type in each queue of the plurality of queues.

6. The method of claim 5, wherein:
    the one or more first factors includes the number of events of each type in each queue of the plurality of queues relative to the number of events in each queue of the plurality of queues, wherein at least one queue of the plurality of queues includes events of different types.

7. The method of claim 1, wherein the one or more first factors includes a class of events published by the first publisher.

8. The method of claim 1, wherein the one or more first factors includes whether one or more publishers, of the plurality of publishers that have published to each queue of the plurality of queues, are currently active.

9. The method of claim 1, wherein the one or more first factors includes an average time between when one or more events that were in a particular queue were published to said particular queue and when said one or more events were removed from said particular queue.

10. The method of claim 1, wherein the one or more first factors includes an average time between when one or more events that were in a particular queue were removed from said particular queue and when said one or more events were fully processed.

11. The method of claim 1, further comprising:
    determining that a third event has occurred in the database system;
    determining a type of the third event;
    if the type is a first type, then (a) determining which queue, of the plurality of queues, is least loaded among the plurality of queues, and (b) placing the third event in the queue that is least loaded among the plurality of queues; and
    if the type is a second type, then (a) determining which queue, of the plurality of queues, is most loaded among the plurality of queues, and (b) placing the third event in the queue that is most loaded among the plurality of queues.

12. The method of claim 1, wherein the one or more first factors include a load of each queue of the plurality of queues or a number of active publishers to each queue of the plurality of queues.

13. A method comprising:
receiving, from a plurality of registrants, at an event monitor of a database system, a plurality of event registration requests, wherein each event registration request of the plurality of event registration requests registers for one or more events;
wherein the event monitor comprises a parallel event processor that comprises at least a first slave process and a second slave process that are separate from the plurality of registrants and a plurality of publishers;
wherein the plurality of publishers generate a plurality of events that occur in the database system;
wherein a first publisher of the plurality of publishers enqueues a first event, of the plurality of events, to a first queue that resides in volatile memory;
wherein a second publisher of the plurality of publishers enqueues a second event, of the plurality of events, to a second queue that resides in non-volatile memory;
the first slave process dequeuing the first event from the first queue and issuing a first notification of the first event to a first registrant of the plurality of registrants, wherein the first slave process is dedicated to processing events only from the first queue; and
the second slave process dequeuing the second event from the second queue and issuing a second notification of the second event to a second registrant of the plurality of registrants, wherein the second slave process is dedicated to processing events only from the second queue;
wherein the method is performed by one or more computing devices.

14. The method of claim 13 wherein:
a third publisher of the plurality of publishers enqueues a third event, of the plurality of events, to a third queue that resides in the volatile memory and that is different than the first queue;
the parallel event processor further comprises a third slave process that is different than the first and second slave processes; and
the method further comprising the third slave process dequeuing the third event from the third queue, wherein the third slave process is dedicated to processing events only from the third queue.

15. The method of claim 13, wherein the second queue only includes persistent events and the first queue only includes in-memory events.

16. The method of claim 13, wherein persistent event publishers of the plurality of publishers publish to the second queue and in-memory event publishers of the plurality of publishers publish to one or more queues that reside in the volatile memory and that include the first queue.

17. One or more volatile or non-volatile storage media storing instructions which, when executed by one or more processors, cause:
generating, by a plurality of publishers, a plurality of events that occur in a database system, wherein the plurality of events includes a first event that is generated by a first publisher and a second event that is generated by a second publisher that is different than the first publisher;
determining, by the first publisher, based on one or more first factors, a first queue from among a plurality of queues to enqueue the first event, wherein one of the one or more first factors is a number of events that are enqueued in each queue of the plurality of queues;
enqueuing, by the first publisher, the first event to the first queue of the plurality of queues;
determining, by the second publisher, based on one or more second factors, a second queue from among a plurality of queues to enqueue the second event, wherein one of the one or more second factors is a number of events that are enqueued in each queue of the plurality of queues; and
enqueuing, by the second publisher, the second event to the second queue of the plurality of queues.

18. The one or more volatile or non-volatile storage media of claim 15, wherein the instructions, when executed by the one or more processors, further cause executing a plurality of slave processes, wherein each queue of the plurality of queues is assigned at most one slave process from the plurality of slave processes.

19. The one or more volatile or non-volatile storage media of claim 15, wherein the instructions, when executed by the one or more processors, further cause, after enqueing the first event to the first queue and for each event of multiple events generated by the first publisher after the first event:
enqueuing, by the first publisher, said each event of the multiple events to the first queue without the first publisher determining to which queue of the plurality of queues to enqueue said each event of the multiple events.

20. The one or more volatile or non-volatile storage media of claim 15, wherein:
the one or more first factors includes a type of each event in each queue of the plurality of queues.

21. The one or more volatile or non-volatile storage media of claim 18, wherein:
the one or more first factors includes a number of events of each type in each queue of the plurality of queues.

22. The one or more volatile or non-volatile storage media of claim 19, wherein:
the one or more first factors includes the number of events of each type in each queue of the plurality of queues relative to the number of events in each queue of the plurality of queues, wherein at least one queue of the plurality of queues includes events of different types.

23. The one or more volatile or non-volatile storage media of claim 15, wherein the one or more first factors includes a class of events published by the first publisher.

24. The one or more volatile or non-volatile storage media of claim 15, wherein the one or more first factors includes whether one or more publishers, of the plurality of publishers that have published to each queue of the plurality of queues, are currently active.

25. The one or more volatile or non-volatile storage media of claim 15, wherein the one or more first factors includes an average time between when one or more events that were in a particular queue were published to said particular queue and when said one or more events were removed from said particular queue.

26. The one or more volatile or non-volatile storage media of claim 15, wherein the one or more first factors includes an average time between when one or more events that were in a particular queue were removed from said particular queue and when said one or more events were fully processed.

27. The one or more volatile or non-volatile storage media of claim 15, wherein the instructions, when executed by the one or more processors, further cause:
determining that a third event has occurred in the database system;
determining a type of the third event;

if the type is a first type, then (a) determining which queue, of the plurality of queues, is least loaded among the plurality of queues, and (b) placing the third event in the queue that is least loaded among the plurality of queues; and if the type is a second type, then (a) determining which queue, of the plurality of queues, is most loaded among the plurality of queues, and (b) placing the third event in the queue that is most loaded among the plurality of queues.

28. The one or more volatile or non-volatile storage media of claim 15, wherein the one or more first factors include a load of each queue of the plurality of queues or a number of active publishers to each queue of the plurality of queues.

29. One or more volatile or non-volatile storage media storing instructions which, when executed by one or more processors, cause:

receiving, from a plurality of registrants, at an event monitor of a database system, a plurality of event registration requests, wherein each event registration request of the plurality of event registration requests registers for one or more events;

wherein the event monitor comprises a parallel event processor that comprises at least a first slave process and a second slave process that are separate from the plurality of registrants and a plurality of publishers;

wherein the plurality of publishers generate a plurality of events that occur in the database system;

wherein a first publisher of the plurality of publishers enqueues a first event, of the plurality of events, to a first queue that resides in volatile memory;

wherein a second publisher of the plurality of publishers enqueues a second event, of the plurality of events, to a second queue that resides in non-volatile memory;

the first slave process dequeuing the first event from the first queue and issuing a first notification of the first event to a first registrant of the plurality of registrants, wherein the first slave process is dedicated to processing events only from the first queue; and the second slave process dequeuing the second event from the second queue and issuing a second notification of the second event to a second registrant of the plurality of registrants, wherein the second slave process is dedicated to processing events only from the second queue.

30. The one or more volatile or non-volatile storage media of claim 27, wherein:

a third publisher of the plurality of publishers enqueues a third event, of the plurality of events, to a third queue that resides in the volatile memory and that is different than the first queue;

the parallel event processor further comprises a third slave process that is different than the first and second slave processes; and the instructions, when executed by the one or more processors, further cause the third slave process dequeuing the third event from the third queue, wherein the third slave process is dedicated to processing events only from the third queue.

31. The one or more volatile or non-volatile storage media of claim 29, wherein the second queue only includes persistent events and the first queue only includes in-memory events.

32. The one or more volatile or non-volatile storage media of claim 29, wherein persistent event publishers of the plurality of publishers publish to the second queue and in-memory event publishers of the plurality of publishers publish to one or more queues that reside in the volatile memory and that include the first queue.

* * * * *

UNITED STATES PATENT AND TRADEMARK OFFICE
CERTIFICATE OF CORRECTION

PATENT NO. : 8,448,186 B2
APPLICATION NO. : 11/777783
DATED : May 21, 2013
INVENTOR(S) : Saxena et al.

It is certified that error appears in the above-identified patent and that said Letters Patent is hereby corrected as shown below:

In the Claims:

In column 14, line 14, in Claim 18, delete "claim 15," and insert - - claim 17, - -, therefor.

In column 14, line 20, in Claim 19, delete "claim 15," and insert - - claim 17, - -, therefor.

In column 14, line 29, in Claim 20, delete "claim 15," and insert - - claim 17, - -, therefor.

In column 14, line 33, in Claim 21, delete "claim 18," and insert - - claim 20, - -, therefor.

In column 14, line 37, in Claim 22, delete "claim 19," and insert - - claim 21, - -, therefor.

In column 14, line 44, in Claim 23, delete "claim 15," and insert - - claim 17, - -, therefor.

In column 14, line 47, in Claim 24, delete "claim 15," and insert - - claim 17, - -, therefor.

In column 14, line 52, in Claim 25, delete "claim 15," and insert - - claim 17, - -, therefor.

In column 14, line 58, in Claim 26, delete "claim 15," and insert - - claim 17, - -, therefor.

In column 14, line 63, in Claim 27, delete "claim 15," and insert - - claim 17, - -, therefor.

In column 15, line 12, in Claim 28, delete "claim 15," and insert - - claim 17, - -, therefor.

In column 16, line 12, in Claim 30, delete "claim 27," and insert - - claim 29, - -, therefor.

Signed and Sealed this
Seventeenth Day of September, 2013

Teresa Stanek Rea
*Deputy Director of the United States Patent and Trademark Office*